March 22, 1932. H. E. KELLOGG 1,850,553
STOPPING AND STARTING ATTACHMENT
Filed Jan. 13, 1927
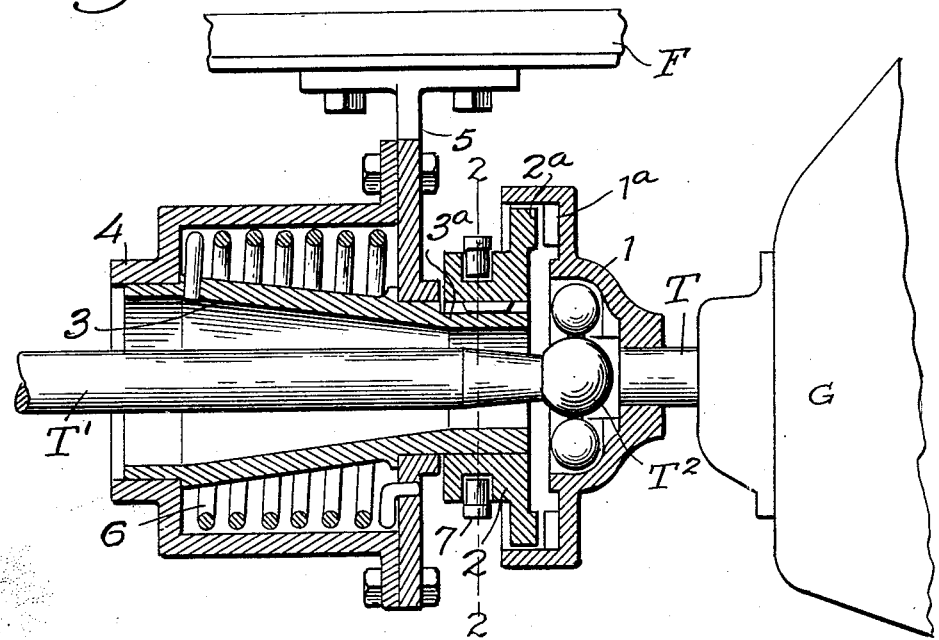
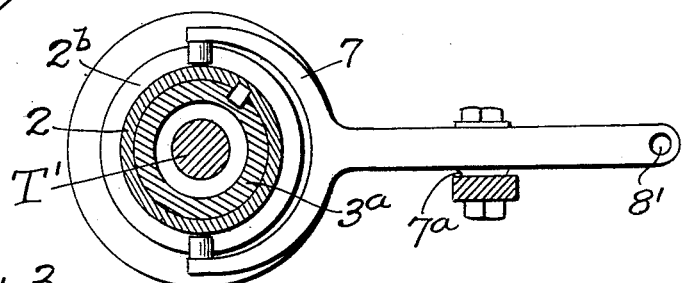
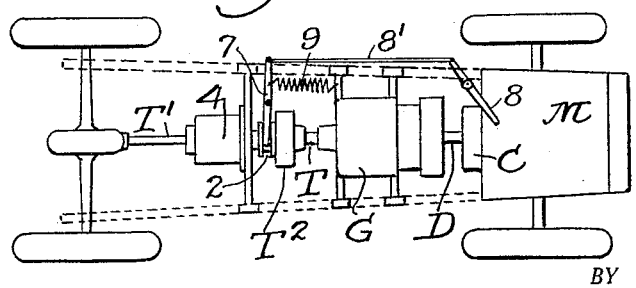
INVENTOR.
Henry E. Kellogg
BY
Alexander & Dowell
ATTORNEYS Patented Mar. 22, 1932

1,850,553

UNITED STATES PATENT OFFICE

HENRY E. KELLOGG, OF BATTLE CREEK, MICHIGAN

STOPPING AND STARTING ATTACHMENT

Application filed January 13, 1927. Serial No. 160,952.

This invention relates to motor-driven vehicles and has particular reference to automobiles, trucks, and the like.

The object of the invention is to provide means to arrest gravital movement and facilitate starting of a motor vehicle on an upgrade. Great difficulty is experienced by drivers of motor vehicles particularly with engines having a small number of cylinders, and especially where the drivers are not expert, in starting a car on an upgrade if for any reason it has been necessary to stop the car on such a grade. Ordinarily when the car is stopped on an upgrade before it can be started again it is necessary to accelerate the motor, release the brake, and shift the gear into "low"; and unless all those are properly done and in proper time the engine will be stalled or killed; and frequently if the brake is released the car moves backward, sometimes resulting in serious accidents; stopping of the engine necessitates a repetition of the whole series of starting operations—plus additional operations of actuating the starter, or cranking the engine.

The object of the present invention is to provide a motor vehicle with manually controlled means whereby the backward movement of the vehicle by gravity can be utilized to stop and hold the vehicle on an upgrade and also store up energy for use to assist in starting it forward, thus relieving the operator of the necessity of holding the wheels on the grade by a brake during the starting operation.

The invention is capable of various embodiments; and in the accompanying drawings I have illustrated one practical mechanism embodying the invention, and the following description thereof will enable others to thoroughly comprehend and understand the invention; and I will refer to the claims for summaries of the essentials of the invention and novel features of construction and combinations of parts for which protection is desired.

In said drawings,—

Figure 1 is a longitudinal sectional view of one construction embodying the invention.

Fig. 2 is a detail sectional view on the line 2—2 of Fig. 1; and

Fig. 3 is a diagrammatic view of the driving mechanism of a motor vehicle.

Referring to the diagram, Fig. 3 of the drawings, the driven shaft D is connected with the engine or motor M by the usual "clutch" C; and drives the transmission shaft section T through variable drive gearing housed in the casing G.

The transmission shaft is ordinarily made in two sections T and T' united by a universal joint coupling $T^2$ to permit the rear axle to move relative to the chassis under road conditions; said transmission shaft driving the rear axle and wheels of the vehicle in the usual manner.

As the aforesaid parts are all well-known and may be of any desired construction, no particular or detailed illustration or description thereof is necessary.

In the present invention the member 1 of the coupling $T^2$ attached to the shaft T is preferably cup shaped and is provided with a clutch member or face 1a opposed to which is a clutch face or member 2a on a disk 2 which is slidably but non-rotatably mounted upon the forward end 3a of a conical sleeve member 3 which surrounds the shaft T' adjacent the coupling $T^2$, and is rotatably mounted in bearings in a suitable housing 4 attached to a bracket 5 bolted to the chassis or frame F of the vehicle, the sleeve 3 being supported in axial alignment with section T of the transmission shaft.

The member 3 is operatively connected with an energy storing means, such as springs or other suitable devices, which will be caused to accumulate resistance or energy by the rotation of the sleeve. In the specific construction shown a helical spring 6 is mounted within the housing 4 and exterior to the sleeve 3, and one end of said spring is connected to the housing 4 and the other end to the sleeve, so that when the sleeve is turned the spring 6 will be wound up; and the spring in unwinding will rotate the sleeve in the reverse direction.

The member 2 is normally held disengaged from the member 1a but may be moved into engagement therewith by any suitable means. As shown a lever 7 has its bifurcated end operatively engaged with the groove 2b in the member 2; said lever may be pivoted on a fixed support 7a; and the free end of the lever may be connected by a rod or chain 8' with a manually operable lever 8 mounted on the vehicle within convenient reach of the operator.

If the vehicle is stopped upon an upgrade and the clutch C is de-clutched, or the variable gears in neutral, the vehicle would move backward by gravity if the brake is released, and shaft T' would turn backward, or oppositely to the direction in which it turns when the vehicle is going forward. If, however, member 2a is engaged with member 1a by properly shifting lever 8 before or as the vehicle moves backward by gravity, sleeve 3 will be turned and wind up and tension spring 6; and the backward movement of the car will be resisted and arrested by the energy storing means, such as spring 6.

The spring, or other suitable energy storing means, will accumulate or store up energy until its resistance arrests the backward gravital movement of the car, and will then stop the car and hold it against backward movement by gravity. When the car has been thus stopped all that the operator has to do when he desires to start the car is to accelerate the motor and engage the clutch, and the car will start as if on a level, the accumulated energy stored in the spring or energy storing device assisting the engine in starting the car forward.

After the car is started and the spring 6 unwinds the member 2a will disengage member 1a. This disengagement may be automatically accomplished by the action of the opposed ratchet faces on the members, or by any other suitable means, f. i. a spring 9 attached to lever 7.

With this construction in starting on an upgrade the operator is free to use his hands and feet as if the car was on a level, and is not compelled to quickly change his hands from one lever to another or his foot from brake to accelerator. This invention will relieve motor car operators from nervous strains in starting a car on an uphill grade, which is particularly trying to a new and nervous operator. The invention not only facilitates starting up hill, but enhances safety and facilitates traffic in that the engine will not be killed in starting, and by obviating the necessity of re-cranking or use of re-starter. It also eliminates excessive wear on the contacting surfaces of the clutch C.

I claim:—

1. In combination with a motor vehicle having a power driven transmission shaft; a rotatable member connectible to the shaft and means for connecting and disconnecting said member and said shaft; and a device operated by said member adapted to arrest backward gravitational movement of the vehicle when the member is connected with the shaft and to assist in the initial forward movement thereof.

2. In combination with a vehicle having a driven shaft, and a transmission shaft; of a rotatable member, manually operable means for connecting and disconnecting said member from the transmission shaft, and spring means operatively connected with said member whereby the backward movement of the vehicle by gravity is arrested when the member is connected with the transmission shaft.

3. In combination with a vehicle having a driven shaft, a transmission shaft and variable gearing between the driven shaft and the transmission shaft; of a rotatable member surrounding the transmission shaft, a spring connected with said rotatable member and manually operable means for connecting the member to said shaft whereby the backward movement of the vehicle by gravity is arrested when the member is engaged with the shaft.

4. In combination with a vehicle having a power driven transmission shaft; of a rotatable member, manually operable means for driving said member from the shaft, power storing means operated by said rotatable member when engaged with the shaft, said storing means being adapted to arrest the backward gravitational movement of the vehicle and assist in the next forward movement of the vehicle.

5. In combination with a vehicle having a power driven transmission shaft; of a rotatable member, manually controlled means for operating said rotatable member from said shaft; spring means for storing energy operatively connected with said rotatable member and adapted to store energy upon the backward movement of the vehicle by gravity when the member is operated by the shaft and to assist in the forward movement of the vehicle when it is again started.

6. In combination with a vehicle having a transmission shaft; of a rotatable sleeve, manually operable clutch means for engaging said sleeve with said shaft; power storing means operated by said sleeve when the sleeve is engaged and the vehicle moves backward by gravity; said storing means being adapted to arrest the backward gravitational movement of the vehicle and assist in the next forward movement of the vehicle, the clutch automatically disengaging when the stored energy is spent.

7. In combination with a vehicle having a transmission shaft; of a rotatable sleeve surrounding said shaft, clutch means for connecting said sleeve to said shaft; means for storing energy operatively connected with said sleeve and adapted to store energy upon the backward movement of the vehicle by gravity when the clutch is engaged and to assist in the forward movement of the vehicle when it is next started, the clutch automatically disengaging when the stored energy is spent.

8. In combination with a vehicle having a transmission shaft; of a rotatable sleeve surrounding said shaft, manually operable clutch means for connecting said sleeve with the shaft, power storing devices operated by said sleeve and when the clutch is engaged and the vehicle moves backward by gravity; said storing means being adapted to arrest backward movement of the vehicle by gravity and to assist the next forward movement of the vehicle, and the clutch automatically disengaging when the stored energy is spent.

9. In combination with a vehicle having a transmission shaft; of a rotatable sleeve surrounding said shaft; a clutch member fixed on the shaft, a second clutch member slidably but not rotatably mounted on the sleeve, manually operable devices for engaging said clutch members; energy storing spring means operated by the sleeve, and adapted to arrest the backward movement of the vehicle by gravity and to assist the next forward movement of the vehicle, the clutch automatically disengaging when the stored energy is spent.

10. In combination with a motor vehicle having transmission devices connected to the wheels thereof and rotatably mounted to move in harmony therewith, of a device adapted to arrest backward gravitational and assist forward movement of the vehicle when connected to the said transmission devices or wheels, and means for connecting the said device for operation, the device automatically disengaging when the vehicle is moving in a forward direction.

11. In a power driven vehicle, having a transmission shaft; a connectible device operable by said shaft, adapted to arrest reverse movement of said shaft and permit free movement of the shaft in the other direction, and to assist in such initial movement of the shaft and means adapted to connect said device to said shaft for operation thereby.

12. In combination with a motor vehicle having a transmission shaft, of a device adapted to be operated by said shaft, and when so operated to arrest undriven movement and to assist in the driven movement of said vehicle; and means for connecting said device to said shaft, for operation thereby.

13. In combination with a motor vehicle having a transmission shaft, of a device adapted to be connected to said shaft and operated by movement of said shaft and when so connected to arrest gravitational movement of said vehicle and assist driven movement in opposite directions; and means for connecting said device to said shaft for operation.

14. In combination with a vehicle having a motor and wheels with driving means extending from said motor to said wheels, of a device connectible at the will of the operator to said driving means and adapted when connected to arrest backward gravitational and assist forward driven movement of said vehicle, and manually controlled means for connecting said device for operation to said driving means; said device automatically disengaging on the forward movement of the vehicle.

In testimony that I claim the foregoing as my own, I affix my signature.

HENRY E. KELLOGG.